United States Patent [19]

Richwell et al.

[11] 3,746,277

[45] July 17, 1973

[54] DRIBBLE CIRCUIT

[75] Inventors: Gunnar Richwell, Oslo, Norway; Antonios I. Giouvalakis, Island Park, N.Y.

[73] Assignee: Potter Instrument Company, Inc., Plainview, N.Y.

[22] Filed: Sept. 2, 1971

[21] Appl. No.: 177,289

[52] U.S. Cl. .................................................. 242/182

[51] Int. Cl. ........................ G11b 15/58, G11b 23/12

[58] Field of Search ................... 242/182, 186, 75.4, 242/75.52

[56] References Cited

UNITED STATES PATENTS

| | | | |
|---|---|---|---|
| 2,921,753 | 1/1960 | Luhti et al. | 242/184 |
| 3,433,427 | 3/1969 | Brown et al. | 242/184 |
| 3,525,480 | 8/1970 | Willard | 242/183 |

*Primary Examiner*—Leonard D. Christian
*Attorney*—Laurence J. Marhoefer

[57] ABSTRACT

In a magnetic tape transport reel servo motor control circuit the magnitude of the holding current is selected as one of two possible magnitudes as a function of the position of the bight of the buffering tape loop with respect to sensors within an associated vacuum column.

1 Claim, 1 Drawing Figure

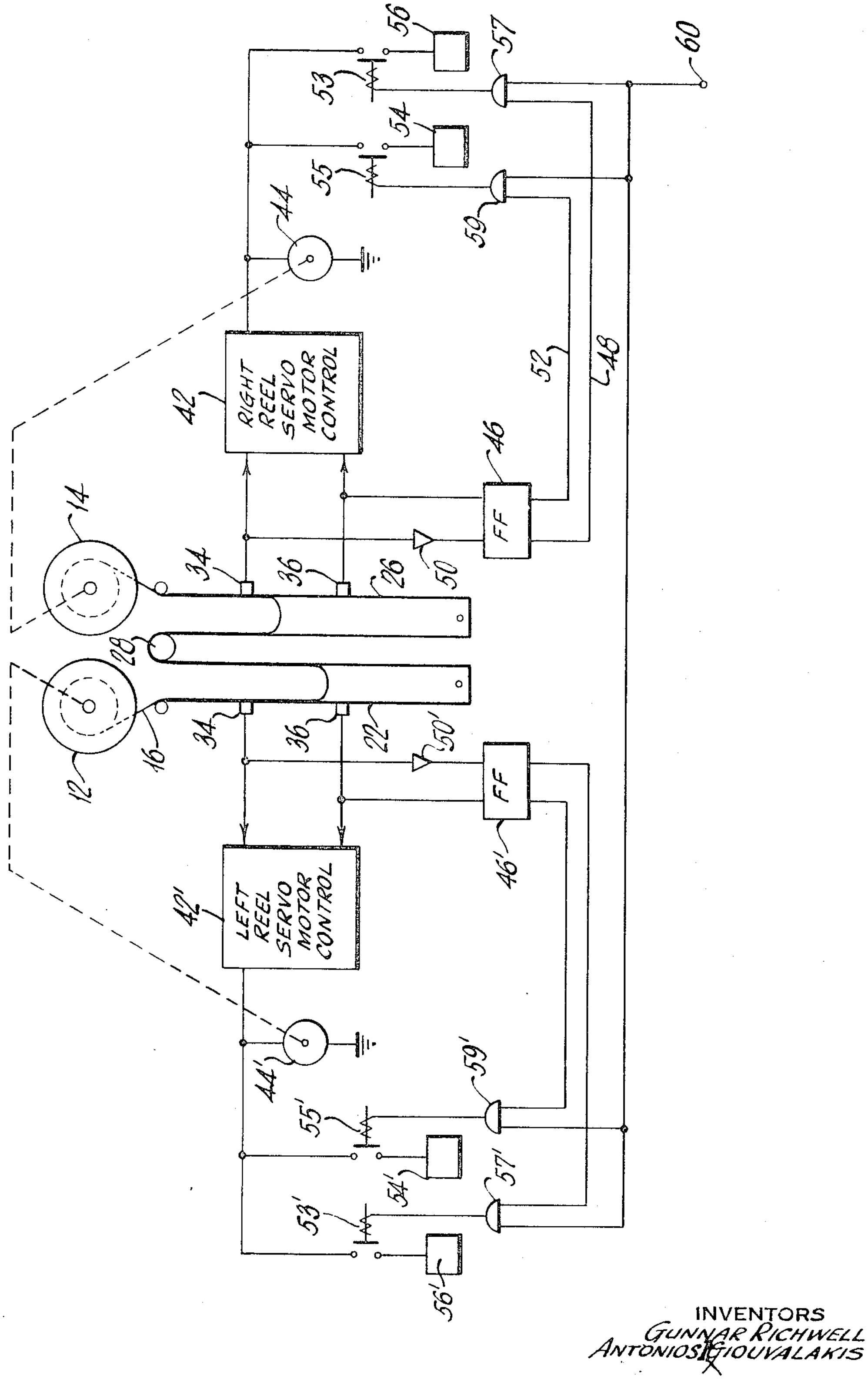
INVENTORS
GUNNAR RICHWELL
ANTONIOS GIOUVALAKIS

DRIBBLE CIRCUIT

BACKGROUND OF THE INVENTION

This invention relates to an improved circuit for controlling a reel servo motor in a digital magnetic tape transport, and more particularly to a circuit which substantially prevents tape motion when the tape transport is in a stand-by condition.

U.S. Pat. No. 3,409,240, assigned to the same assignee as this application, discloses a reel servo system for magnetic tape transports in which the reel motor is energized to drive it in one direction when a buffering tape loop rises above an upper sensor, to drive it in the opposite direction when the buffering loop falls below a lower sensor and to dissipate its kinetic energy when the loop is positioned between the two sensors. The motor is energized with a small current to counterbalance the force exerted by the buffering tape loop when the transport is in a so-called stand-by condition, i.e., when the capstan is at rest and no tape is being transported. In accordance with the teachings of the aforementioned U.S. Pat. No. 3,409,240, the magnitude of this small stand-by current is fixed.

Although the prior art system is generally satisfactory, the force on the tape during stand-by varies as amount of tape on the reel varies because the moment arm through which the tape acts in exerting a rotational torque on the reel servo motor is a function of the amount of tape on the reel. Between an empty and full reel, the torque may vary by a factor of approximately 1.8, or more. Although the frictional forces in the system tend to limit tape motion, in the prior art system a single current could not provide a proper balancing force for both a full and empty tape reel. As a result, the tape would move between the upper or the lower sensor and an intermediate position when the transport was in a stand-by condition under certain circumstances. As will be readily appreciated, such tape motion is highly undesirable.

The object of this invention is to provide a simple, inexpensive circuit which prevents tape motion during stand-by conditions.

SUMMARY

Briefly, this invention contemplates the provision of two selectable currents for energizing the reel servo motor during stand-by. The magnitude of the first current is sufficient for the reel servo motor to balance the torque exerted by the tape as it is pulled in the vacuum column when the reel is between approximately half full and full of tape. The second current balances the torque when the reel is between approximately empty and half full. In the stand-by condition, if the tape passes the lower sensor, the first current is selected and if the loop passes the upper sensor the second current is selected.

BRIEF DESCRIPTION OF THE DRAWINGS

Having briefly described this invention, it will be described in greater detail along with other objects and advantages in the following detailed description of a preferred embodiment which may be best understood by reference to the accompanying drawing which forms part of the instant specification and in which:

The single FIGURE is a schematic diagram of a circuit in accordance with the teachings of this invention.

DESCRIPTION OF THE PREFERRED EMBODIMENT

A specific embodiment of a reel servo system in conjunction with which this invention is particularly well suited for use is disclosed in the aforementioned U.S. Pat. No. 3,409,240, to which reference should be made for specific details of its operation.

As disclosed in that patent the digital magnetic tape transport includes a left reel 12 and a right reel 14 sometimes referred to as the machine reel and file reel, respectively. A magnetic tape 16 extends between these reels and engages a capstan 28, which is centrally disposed between the reels. A pair of vacuum buffers 22 and 26 receive tape from the reels 12 and 14 respectively and form buffering loops therein.

There is an upper tape sensor 34 and a lower tape sensor 36, which may be photoelectric or pneumatic sensors for example, in each of the columns 22 or 26. As will be readily apparent to those skilled in the art, this invention is substantially the same for the right and left hand reels. For this reason, only the right hand system will be described herein.

The upper sensor 34 and the lower sensor 36 in the right hand column 26 are coupled to a right reel servo control 42 which may be the same as that described in the above cited U.S. Pat. 3,409,240. The output of the control circuit 42 controls the energization of a reel servo motor 44 which is coupled to the file reel 14. When the capstan 28 is driving the tape 16, control circuit 42 energizes the motor 44 to drive the reel in a clockwise direction if the upper sensor 34 is uncovered and to drive the reel in a counterclockwise direction if the lower sensor 36 is covered. When the upper sensor is covered and the lower sensor uncovered the motor is dynamically braked.

In accordance with the teachings of this invention, two selectable current sources 54 and 56 of a suitable type known in the art are provided for energizing the motor 44 when the transport is in a stand-by condition. With current source 56 coupled to the motor 44, the torque developed by the motor in combination with the system friction is sufficient to balance the pull exerted by the tape when the amount of tape on the reel is between half full and approximately empty. Similarly, with current source 54 coupled to the motor, the torque developed is sufficient to balance the tape pull when the tape on the reel is between half full and full.

Relays 53 and 55 respectively couple the current sources 54 and 56 to the motor 44. As will be understood by those skilled in the art, any suitable switching apparatus known in the art may be used in place of the relays illustrated.

The output from a pair of AND gates 57 and 59 energize relays 53 and 55 respectively which are in an open position when unenergized. One enabling input to AND gate 57 and one enabling input to AND gate 59 is derived from the tape transport controller signal at terminal 60 which provides an enabling input to the AND gates whenever the tape transport is in a stand-by condition.

The other enabling input to gates 57 and 59 is provided by the outputs of a flip-flop 46. An inverter 51 couples the upper sensor 34 to set input of the flip-flop 46 and a lead couples the lower sensor 36 to the reset input.

When the upper sensor 34 is uncovered the output of inverter 51 sets the flip-flop 46 and when the lower sensor 36 is covered the signal produced by the sensor resets the flip-flop. When set, an output on lead 48 provides an enable input to AND gate 59; similarly, an output on lead 52 provides an enabling input to AND gate 57 when the flip-flop is reset.

In operation, with the transport in a stand-by condition a suitable logic signal at terminal 60 provides one enabling input to AND gates 57 and 59. If flip-flop 46 is set AND gate 59 is enabled and its output closes relay 55, thereby coupling current source 56 to the reel servo motor 44. Reel servo motor 44 maintains the tape 16 in the vacuum column 26 in a stationary position between the sensors 34 and 36 so long as the amount of tape on tape reel 14 is less than half full.

If the reel 14 is more than half full, the tape will move slowly down the vacuum column until the lower sensor 36 is covered, resetting flip-flop 46. In this state gate 57 is enabled and gate 59 disenabled. Relay 53 closes coupling current source 54 to the reel motor 44. Since the current provided by source 54 is larger than that provided by source 56 the torque applied by the motor to the reel 14 increases. The tape in the column 26 moves upwardly until it is positioned at reset between the upper and lower sensors.

As tape fills the reel 14 more than half full, the torque applied by the motor 44 will pull the tape up in column 26 until the upper sensor 34 is uncovered. This sets the flip-flop 46, decouples the source 54 and couples the source 56 to the motor. The tape drops in the tank due to the reduced motor torque and comes to rest again.

When the tape transport is running and not in a stand-by condition, AND gates 57 and 59 are disenabled due to the absence of an enabling signal at terminal 60, thereby uncoupling both source 54 and source 56 from the motor. The operation of the system in a running state may be the same as that described in the U.S. Pat. No. 3,409,240.

Although the present invention has been described with reference to specific embodiments, it will be appreciated that a variety of changes may be made without departing from the scope of the invention. For example, certain features may be used independently of others and equivalents may be substituted all within the spirit and scope of the invention.

What is claimed is:

1. In a magnetic tape transport which employs a vacuum column to form a buffering loop in the tape, a circuit for maintaining the loop substantially stationary when the transport is in a standby condition comprising in combination:

an upper and lower tape loop position sensor for the vacuum column;

a tape reel servo motor;

a first and a second current source for respectively selectively energizing said servo motor when said transport is in a standby condition in order to balance the forces on the tape exerted by said vacuum column, said second current source being larger than first current source;

a bistable circuit;

means responsive to an output from said upper sensor when the bight of said loop rises above the upper sensor to set said bistable circuit in its first state;

means responsive to an output from said lower sensor when the bight of said loop drops below the lower sensor to set said bistable circuit in its second state;

means responsive to an output of said bistable circuit in its first state for coupling said second current to said servo motor;

means responsive to an output of said bistable circuit in its second state for coupling said first current source of said servo motor.

* * * * *